(12) United States Patent
Viswanathan et al.

(10) Patent No.: US 9,294,447 B2
(45) Date of Patent: Mar. 22, 2016

(54) ACCESS CONTROL

(75) Inventors: Kapaleeswaran Viswanathan, Bangalore (IN); Amitabh Saxena, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 13 days.

(21) Appl. No.: 14/112,549

(22) PCT Filed: Apr. 18, 2011

(86) PCT No.: PCT/IN2011/000257
§ 371 (c)(1),
(2), (4) Date: Oct. 18, 2013

(87) PCT Pub. No.: WO2012/143930
PCT Pub. Date: Oct. 26, 2012

(65) Prior Publication Data
US 2014/0040619 A1 Feb. 6, 2014

(51) Int. Cl.
*H04L 9/32* (2006.01)
*H04L 29/06* (2006.01)
*H04L 9/08* (2006.01)
*H04W 12/02* (2009.01)
*H04W 12/08* (2009.01)
*H04L 12/58* (2006.01)

(52) U.S. Cl.
CPC .......... *H04L 63/0428* (2013.01); *H04L 9/0869* (2013.01); *H04L 51/32* (2013.01); *H04L 63/10* (2013.01); *H04W 12/02* (2013.01); *H04W 12/08* (2013.01)

(58) Field of Classification Search
CPC . H04L 63/0428; H04L 63/08; H04L 2209/24; H04L 9/32; H04L 9/3247
See application file for complete search history.

(56) References Cited

U.S. PATENT DOCUMENTS

| 5,343,425 | A | * | 8/1994 | Saito et al. ............... 365/189.14 |
| 5,911,143 | A | | 6/1999 | Deinhart et al. |
| 5,999,978 | A | | 12/1999 | Angal et al. |
| 6,064,656 | A | | 5/2000 | Angal et al. |
| 2005/0055570 | A1 | | 3/2005 | Kwan et al. |
| 2007/0016637 | A1 | * | 1/2007 | Brawn et al. .................. 709/200 |
| 2007/0192592 | A1 | * | 8/2007 | Goettfert et al. .............. 713/162 |

(Continued)

FOREIGN PATENT DOCUMENTS

| CN | 101005359 A | 7/2007 |
| CN | 101370012 A | 2/2009 |

(Continued)

OTHER PUBLICATIONS

European Search Report (Supplementary), Sep. 18, 2014, Hewlett-Packard Development Company, L.P., European Patent Application No. 11863920.2.
International search report and written opinion (ISR/WO) in priority PCT patent application, PCT/IN2011/000257, dated Jan. 19, 2012.

*Primary Examiner* — Fatoumata Traore
(74) *Attorney, Agent, or Firm* — FabianVanCott (57) ABSTRACT

A communication access control system (100) includes at least one access control cell (160), implemented on a computing entity, for computing random input addresses (205) and random output addresses (210) upon a request of a system user (105). The input and output addresses are based on a cryptographic key (165) held by a service facility (115) associated with the at least one access control cell (160).

13 Claims, 7 Drawing Sheets

(56) References Cited

U.S. PATENT DOCUMENTS

| | | |
|---|---|---|
| 2007/0283042 A1* | 12/2007 | West et al. .................. 709/238 |
| 2008/0244738 A1 | 10/2008 | Shiozawa et al. |
| 2008/0288777 A1 | 11/2008 | Lai et al. |
| 2009/0262929 A1* | 10/2009 | Walmsley ..................... 380/46 |

FOREIGN PATENT DOCUMENTS

| | | | |
|---|---|---|---|
| WO | WO-2007/088174 A1 * | 1/2006 | ............ H04L 29/12 |
| WO | 2007011950 A1 | 1/2007 | |
| WO | WO-2007088174 | 8/2007 | |
| WO | 2009140983 A1 | 11/2009 | |

\* cited by examiner

ACCESS CONTROL

BACKGROUND

Distributed computing is a method of computing in which tasks are divided into relatively smaller sub-tasks that are then distributed across a network of computing devices for simultaneous processing. Distributed computing has been used in a myriad of applications and systems such as, for example, social networking, online digital mapping, video-sharing websites, and advanced collaboration software.

However, there is generally a lack of built-in security mechanisms that insure the safety and integrity of data that is being processed through a distributed computing system. For example, Uniform Resource Identifier (URI) technology, often used in connection with distributed computing applications, may provide a naming and accessing mechanism, that allows users to create, share, and destroy data objects such as text, images, multi-media objects and metrics of various kinds. However, with these data objects scattered throughout the distributed computing system, the issue is how to prevent unauthorized or undesired accessing, altering or deletion of the data objects.

BRIEF DESCRIPTION OF THE DRAWINGS

The accompanying drawings illustrate various examples of the principles described herein and are a part of the specification. The illustrations are merely examples and do not limit the scope of the claims.

Throughout the drawings, identical reference numbers designate similar, but not necessarily identical, elements.

DETAILED DESCRIPTION

As discussed above, the use of distributed computing systems has increased recently due to the advent of cloud computing, Web 2.0, and software-as-a-service applications. Distributed computing uses distributed resources, objects, and services to allow an end user to create, share, and destroy information resources such as text, images, multi-media, and metrics of various kinds. As a result, sharing and concurrently using distributed objects and resources is continuing to increase. However, the applications in which distributed computing are implemented still generally use a Uniform Resource Identifier (URI) to provide naming and accessing mechanisms for the World Wide Web. As mentioned above, however, the Uniform Resource Identifier (URI) mechanisms do not include any built in security mechanisms which may allow a user in a network such as, for example, the Internet to securely name, access, and protect the objects on their systems.

To overcome this security issue, a system may use an Access Control List (ACL). The Access Control List (ACL) is a stored list of information that includes a list of authorized entities or users as well as a list of every object in the system. An access control monitor may then consult the Access Control List (ACL) to determine whether, for example, a request by an entity to access an object can be allowed or denied. In order to accomplish this, the access control monitor will verify the claimed identity of the entity that sent the access request. Authentication of the entity is, therefore, a prerequisite before an entity is allowed to access and otherwise manipulate the object in question.

However, Access Control List-based control monitoring systems are not without their disadvantages when implemented in a distributed computing system. For example, the Access Control List used by the access control monitor increases in size exponentially with an increase in the number of users and objects involved. Storing such a large amount of data may prove to be a daunting task and may include additional costs to the system by requiring the purchase of additional hardware.

Additionally, as the number of users increases, the number of access requests will also increase which may overload the system. Moreover, as indicated above, individual users need to be authenticated for access to the system. As the number of users increases, so does the computing resources needed to authenticate each user who is attempting to access objects on the Access Control List. As users navigate through the system, the system may be overloaded with these access and authentication requests. Eventually, there may be so many requests that a backlog of access requests may be created resulting in slow service to the users.

At some point, the quality of service to the users may become slow enough that users a discouraged from using the application or system. Where, for example, the distributed computing system or application is an online service or website, this may result in a loss of traffic and revenue.

The present specification, therefore, describes a cryptographic system and set of access control primitives for secure, capability-based naming, access, and protection mechanisms for use in a distributed computing environment for realizing efficient, but secure, access control. The system includes a trusted central facility that is the security micro-kernel for a distributed message passing system between many clients. The central facility may posses a secret cryptography key that may be stored and used within, for example, a piece of trusted hardware that is connected to the Internet via a suitable server.

The central facility includes a number of cells that are dynamically created when needed based on a number of cryptographic rules. These cells may receive data from an input address (IA) and send data from an output address (OA), both of which are randomized cryptographic numbers. The cell represents a communication capability described by the tuple (IA, OA) such that the output address cannot be computed knowing the input address and visa versa without the possession of the secret cryptography key mentioned above.

Users or entities in possession of the input address (IA) can send or write messages to the cell and entities in possession of the output address (OA) can receive or read messages from the cell. However, entities in possession of the input address (IA) cannot receive or read messages from the cell without the output address (OA), and entities in possession of the output address (OA) cannot send or write messages to the cell without the input address (IA).

This concept of cryptographically generated input and output address can be used in several different contexts.

First, in a distributed computing environment, users who are to have access to specific data objects can be provided with the input and/or output address for the location of that data. Consequently, messages or commands regarding that data sent by that user need not be authenticated or processed by an Access Control List. Rather, possession of the correct input/output address for the operation instructed is considered authorization to perform that operation. And, as will be described herein, only by possessing the correct input/output address can an entity actually obtain access to a data object to perform any operation on that data object.

Second, in social networking and messaging applications, which are also distributed computing environments, users may desire to control who can send messages to them and who can receive the messages they send. The idea of cryptographically generated input and output addresses can be used in this context to allow a first user to select what other users can send messages to the first user and what other messages can receive messages from the first user. A user who does not have the input address for the first user, cannot send messages to the first user. Likewise, a user who does not have the output address of the first user cannot receive messages from the first user.

For simplicity, the following detailed description will generally describe this second scenario, i.e., using cryptographically generated input and output addresses to control when other users can send messages to or receive messages from a first user. However, it will be understood that the term "message" may also refer to an operational command to access, edit or delete data that is being processed in a distributed computing environment and that the "users" referred to may be computing entities or data locations in a distributed computing environment.

Thus, while the following description specifically addresses the controlled transfer of messages between "users," the principles described apply equally to controlling messages sent between human users and authenticating operational command messages that are sent between computing entities or human users in a distributed computing environment that is processing a number of data objects as part of a particular task being performed by multiple entities working in parallel.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

As noted above, the term "message" as used in the specification and claims may refer to either a message exchanged between human users or an operational command to a computing entity. The term "user" as used in the specification and claims may refer to either a human user operating a computing device or to a computing entity that may be operating automatically according to programming in a distributed computing environment.

Figure 1:
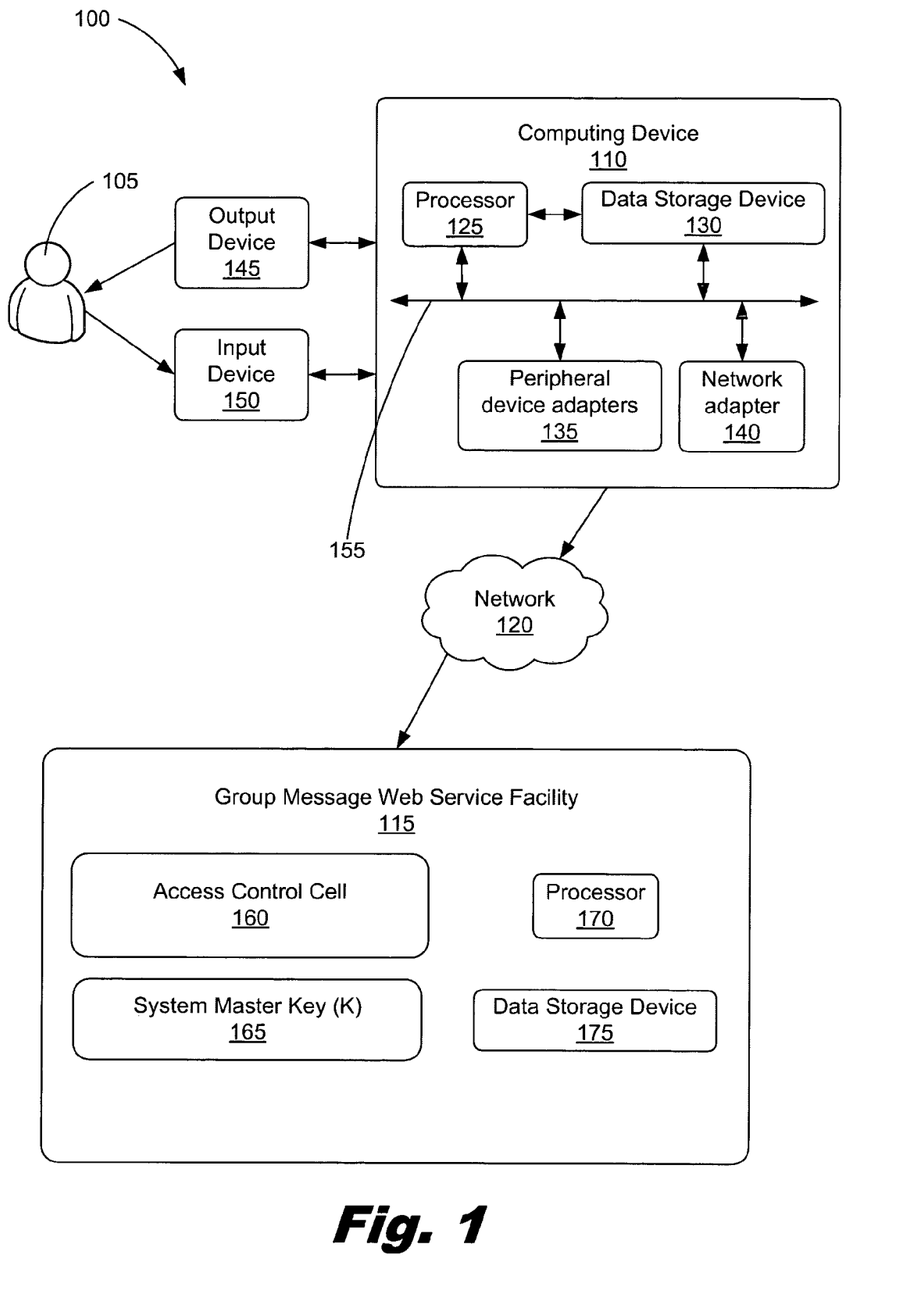
FIG. 1 is a diagram of a system for secure access control over a distributed computing environment, according to one example of principles described herein.

Turning now to FIG. 1, a diagram of a system (100) for secure access control over a distributed computing environment, according to one example of principles described herein is shown. In the present example, for purposes of simplicity in illustration, a user (105) may gain access to a trusted central facility, called a group message web service (GMWS) facility (115), through a network (120) by use of a user computing device (110). However, the principles set forth in the present specification extend equally to any alternative configurations in which the computing device (110) may obtain access to the group message web service (GMWS) facility (115). In one example, the computing device (110) may comprise the group message web service (GMWS) facility (115) and thereby allow the user to directly access the group message web service (GMWS) facility (115) through the computing device (110) without accessing a group message web service (GMWS) facility (115) through a network.

Additionally, although FIG. 1 illustrates a single user (105), this is merely for simplicity in the illustration. It will be understood that any number of users may also gain access to the group message web service (GMWS) facility (115). In this example, each user may gain access to the group message web service (GMWS) facility (115) in order to securely read and write messages and identify other users and messages sent by other users.

Still further, although FIG. 1 illustrates a web-based or cloud computing scenario, the principles described herein may extend equally to other applications where a single cell is used to securely pass data between computing devices. However, for purposes of simplicity in illustration, the present specification will be described in the context of a distributed computing scenario on the World Wide Web, without a loss of generality.

As mentioned above, the system (100) may include a computing device (110) and a network (120) through which a user (105) may gain access to a group message web service (GMWS) facility (115). The computing device (110) may be any device that achieves the desired functionality of, at least, sending and receiving data to and from the group message web service (GMWS) facility (115). To achieve its desired functionality, the computing device (110) includes various hardware components. Among these hardware components may be a processor (125), a data storage device (130), peripheral device adapters (135), a network adapter (140), an output device (145), and an input device (150). These hardware components may be interconnected through the use of a number of busses and or network connections. In one example, the processor (125), data storage device (130), peripheral device adapters (135), and network adapter (140) may be communicatively coupled via bus (155).

The processor (125) may, include the hardware architecture for retrieving executable code from the data storage device (130) and executing the executable code. The executable code may, when executed by the processor (125), cause the processor (125) to implement at least the functionality of sending and receiving data to and from a group message web service (GMWS) facility (115). In the course of executing code, the processor (125) may receive input from, and provide output to, a number of the remaining hardware units.

In one example, the computing device (110), specifically the processor (125), may send a query to the group message web service (GMWS) facility (115) to obtain a random access control cell (160) and, when applicable, share an input address, an output address, or both with other users of the system (100). The processor (125) may also receive messages from an access control cell (160) after the access control cell (160) has received a message from another user and mechanically computed and forwarded the message to the user (105).

The data storage device (130) may store data such as an access control cell (160). Although, FIG. 1, depicts the access control cell (160) as being part of the group message web service (GMWS) facility (115), the access control cell (160) may also be stored on the data storage device (130) of each of the users' (105) computing devices (110). Indeed, the data storage device (130) may store a number of access control cells (160) and may further save them in the form of a database for easy retrieval when the access control cell (160) is once again accessed by the user (105).

The data storage device (130) may include various types of memory modules, including volatile and nonvolatile memory. For example, the data storage device (130) of the present example includes Random Access Memory (RAM), Read Only Memory (ROM), and Hard Disk Drive (HDD) memory. Many other types of memory are available in the art, and the present specification contemplates the use of many varying types of memory (130) in the data storage device (130) as may suit a particular application. In certain examples, different types of memory in the data storage device (130) may be used for different data storage needs. For example, the processor (125) may boot from Read Only Memory (ROM), maintain nonvolatile storage in the Hard Disk Drive (HDD) memory, and execute program code stored in Random Access Memory (RAM).

Generally, the data storage device (130) may comprise a computer readable storage medium. For example, the data storage device (130) may be, but is not limited to, an electronic, magnetic, optical, electromagnetic, infrared, or semiconductor system, apparatus, or device, or any suitable combination of the foregoing. More specific examples of the computer readable storage medium may include, for example, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store an access control cell (160).

The peripheral device adapter (135) may provide an interface to the input (150) and output (145) devices to create a user interface and/or access external sources of memory storage. As will be discussed below, an output device (150) may be provided to allow a user to interact with a group message web service (GMWS) facility (115). The peripheral device adapter (135) may also create an interface between the processor (125) and a printer, a display device, or other output device.

A network adapter (140) may additionally provide an interface to the network (120), thereby enabling the transmission of data to, and receipt of data from, the group message web service (GMWS) facility (115). Specifically, the network adapter (140) may enable the transmission of an access control cell (160) between the computing device (110) and the group message web service (GMWS) facility (115).

The group message web service (GMWS) facility (115) logically includes a number of access control cells (160) and a number of cryptography keys. The group message web service (GMWS) facility (115) may also comprise a processor (170) and data storage device (175) similar to the processor and data storage device within the computing device (110) discussed above. As will be discussed later, the processor (170) may be used to compute an input address and an output address when appropriate. Additionally the data storage device (175) is used to store both a secret cryptographic key and an access control cell (160).

In one example, the secret cryptography key is called a system master key (165) indicated in some equations within this description by the letter "K." With the system master key (165), the group message web service (GMWS) facility (115) may generate a number of access control cells (160) that include an input address (IA) and output address (OA). These addresses are cryptographically generated using the system master key (165). With the input address (IA) or output address (OA), a user may have the authority to write messages to, or read messages from, another user. Additionally, in order to allow for interaction with other users, the user (105) need only send another user the input address (IA) or output address (OA) of the access control cell (160). More details on how this may be accomplished will be discussed below in connection FIGS. 3 and 4.

In another example, instead of a secret cryptography key, the user (105) may send a public key, indicated in some equations within this description by the letter "Y." With the public key, the access control cell (160) may compute an input address (IA) and an output address (OA) using a hash function based on the public key Y. Therefore, the user (105) may share the public key instead of a cell address, with those users with whom the user (105) may wish to interact. More details on how this may be accomplished will be discussed below in connection FIGS. 5 and 6. In each of the three different types of cells (first type in FIGS. 3 and 4, and the other two types in FIGS. 5 and 6), the master key may not be the same. For increased security, the keys may be independent.

Figure 2:
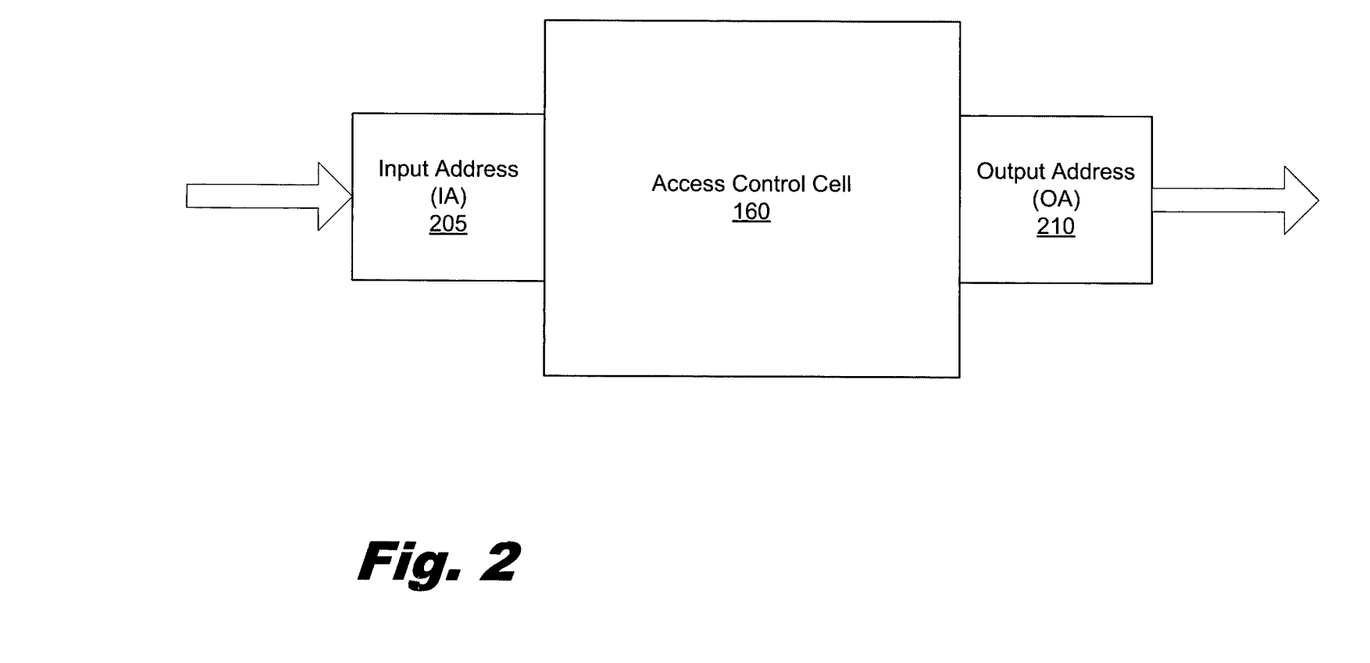
FIG. 2 is a diagram of an access control cell, according to one example of principles described herein.

FIG. 2 is a diagram of an access control cell (160), according to one example of principles described herein. The access control cell (160) receives an input address (205) from, and provides an output address (210) to, various users of the system (FIG. 1, 100). As will be described in more detail in connection with FIGS. 3-7, the input address (205) and output address (210) are cryptographic numbers that may be 256-bits long. The input address (205) and output address (210) are related by a secure permutation such as that defined by a symmetric key encryption algorithm under the effect of the system master key (FIG. 1, 165).

In one example, the input address (205) may be defined by the following equation:

$$AI = E(K, OA) \qquad \text{eq. (1)}$$

In the above equation (eq. (1)), the output address (210), denoted by the term "OA," is drawn from a cryptographically secure PseudoRandom Bit Generator (PRBG), and E is a symmetric encryption method such as, for example, $AES_{256}{}^{13}$. The access control cell (160), therefore, represents a communication capability described by the tuple (IA, OA) such that OA cannot be computed from the IA and vice versa without possession of the system master key K. As a result, only those users that posses the input address (205) can send or write messages to the access control cell (160) and only those users that possess the output address (210) can receive or read messages from the access control cell (160).

As briefly described above, the access control cell (160) may be stored at either a central facility such as, for example, a group message web service (GMWS) facility (FIG. 1, 115) or on each user's computing device (110). Therefore, each user's computing device (110) may store a number of access control cells (160). A myriad of different types of computing devices (110) may be used. Examples may include but are not limited to, desktop computers, laptop computers, notebook computers, tablet computers, cell phones, smart phones, personal digital assistants (PDAs), as well as other computing devices capable of being connected to a network.

Figure 3:
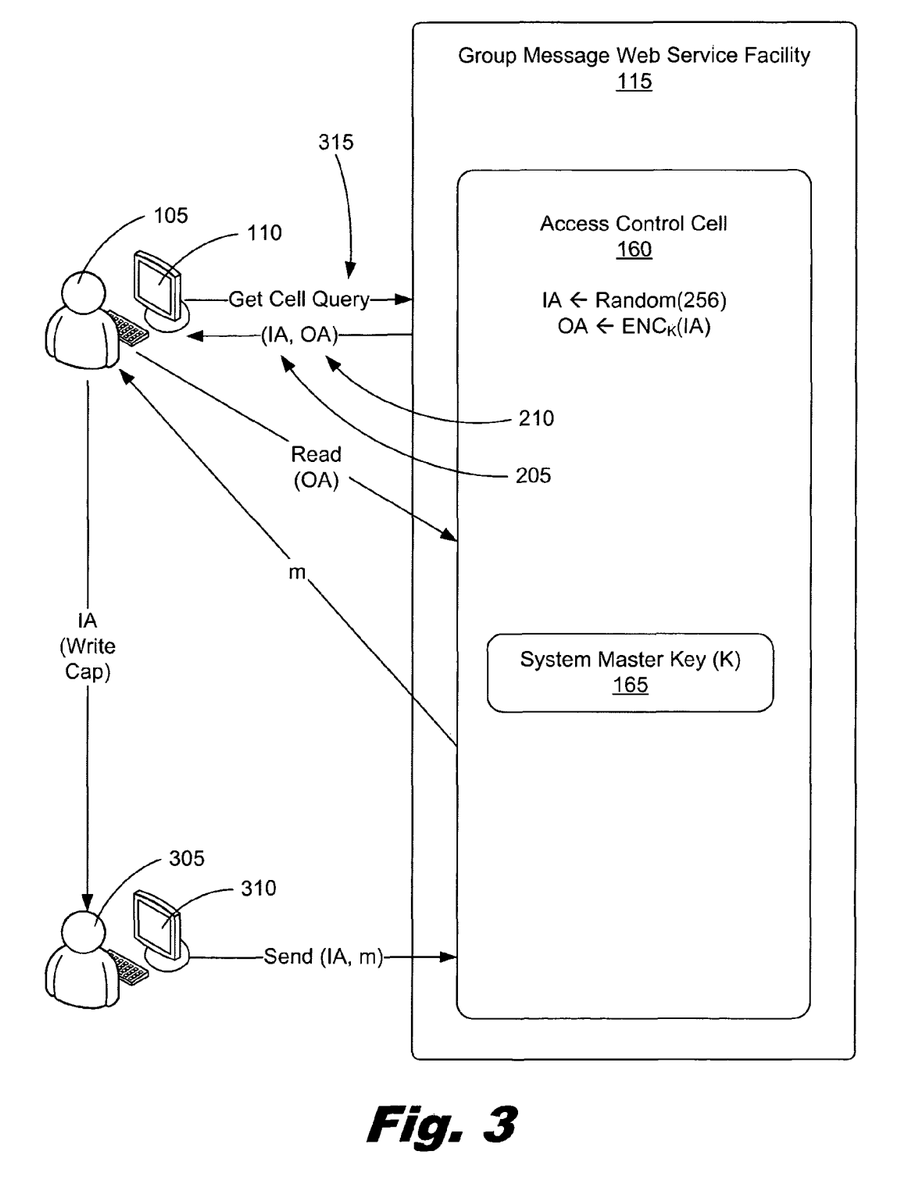
FIG. 3 is a diagram of an access control cell being implemented to provide a user, via a computing device, with the ability to give another user the ability to send or write messages to the user, according to one example of principles described herein.

FIG. 3 shows an access control cell (160) being implemented to provide a user (105), via a computing device (110), with the ability to give another user (305) the ability to send or write messages to the user (105), according to one example of principles described herein. As mentioned above, a number of users may have access to the group message web service (GMWS) facility (115). However, many non-system users (305) may not have access or rights to write to system users (105). To allow non-system users (305) to write messages to users (105) of the group message web service (GMWS) facility (115), the user (105) may perform the computational protocols shown in FIG. 3. Specifically the user (105) may send a get cell query message (315) to the group message web service (GMWS) facility (115). The get cell query message (315) may be sent, for example, in the form of an HTTP message or confidential and secure messaging system that can assure that the message remains confidential.

When sending a get cell query message (315) to the group message web service (GMWS) facility (115), the user (105) may obtain an input address (205) and an output address (210), again denoted in FIG. 3 as IA and OA, respectively. Specifically, when the user (105) sends a get cell query message (315) to the group message web service (GMWS) facility (115), the group message web service (GMWS) facility (115) generates a random access control cell (160) which contains a randomized input address (205) and output address (210). The access control cells (160) generate the input address (205) and output address (210) using a number of equations. In one example, the input address (205) may be generated using a symmetric encryption method such as, for example, the US National Institute of Standards and Technology's Advanced Encryption Standard with a key size of 256 bits ($AES_{256}^{13}$). Additionally, in one example, the access control cell (160) may generate the output address (210) by encrypting the randomly generated input address (205) using the system master key (165) again denoted as K in FIG. 3.

Once the user (105) has obtain the randomized input address (205) and output address (210) and in order to allow non-system user (305) to be able to send messages to the user (105), the user (105) may send the input address (205) to the non-system user (305). With the knowledge of the input address (205), the non-system user (305), through an appropriate computing device (310) may send a message containing the input address (205) to the access control cell (160). The access control cell (160) may then know, through the attached input address (205), that the sender of the message, denoted by "m" in FIG. 3, is authorized to have the message forwarded to the user (105). By this method, the group message web service (GMWS) facility (115) ensures that messages sent to random access control cells (160) are dropped without ever being forwarded or read.

As the non-system user (305) sends the message to the access control cell (160) along with the input address (205), the access control cell (160) mechanically computes the output address (210) by decrypting the attached input address (205) using the system master key (165), i.e. $OA=D_K(IA)$. Therefore, the system master key (165) is kept secret by the group message web service (GMWS) facility (115) and at no time do any non-system users (305) or system users (105) posses the system master key (165).

In another example, the group message web service (GMWS) facility (115) may contain a number of system master keys (165). Using multiple system master keys (165) may further able the group message web service (GMWS) facility (115) to provide more security by adjusting the system master key (165) value from time to time.

After the access control cell (160) has converted the input address (205) to the output address (210) using the system master key (165), the access control cell (160) may then allow the message to be forwarded onto the user (105). Therefore, the user (105) listening for a message containing the specific output address (210) will receive and be able to read the message sent by the non-system user (305). In this way, the user (105), by sharing his or her input address (205) with those from whom who he or she wishes to receive messages, may receive those messages in a secure manner. The user (105), may therefore, share the input address (205) with multiple users or non-users of the system (FIG. 1, 100) from whom he or she wishes to receive messages, thereby creating a logical group of senders.

The user (105) may additionally be given the ability to revoke the capability to send messages from selected individuals without blocking messages from the remaining approved senders. Specifically, the user (105) may direct the system (FIG. 1, 100) to stop forwarding messages having a specific output address (210) corresponding to the previously shared input address (205). Therefore, a number of access control cells (160) may be created by the user sending a get cell query message (315), each cell (160) containing a different input address (205) and corresponding output address (210).

Figure 4:
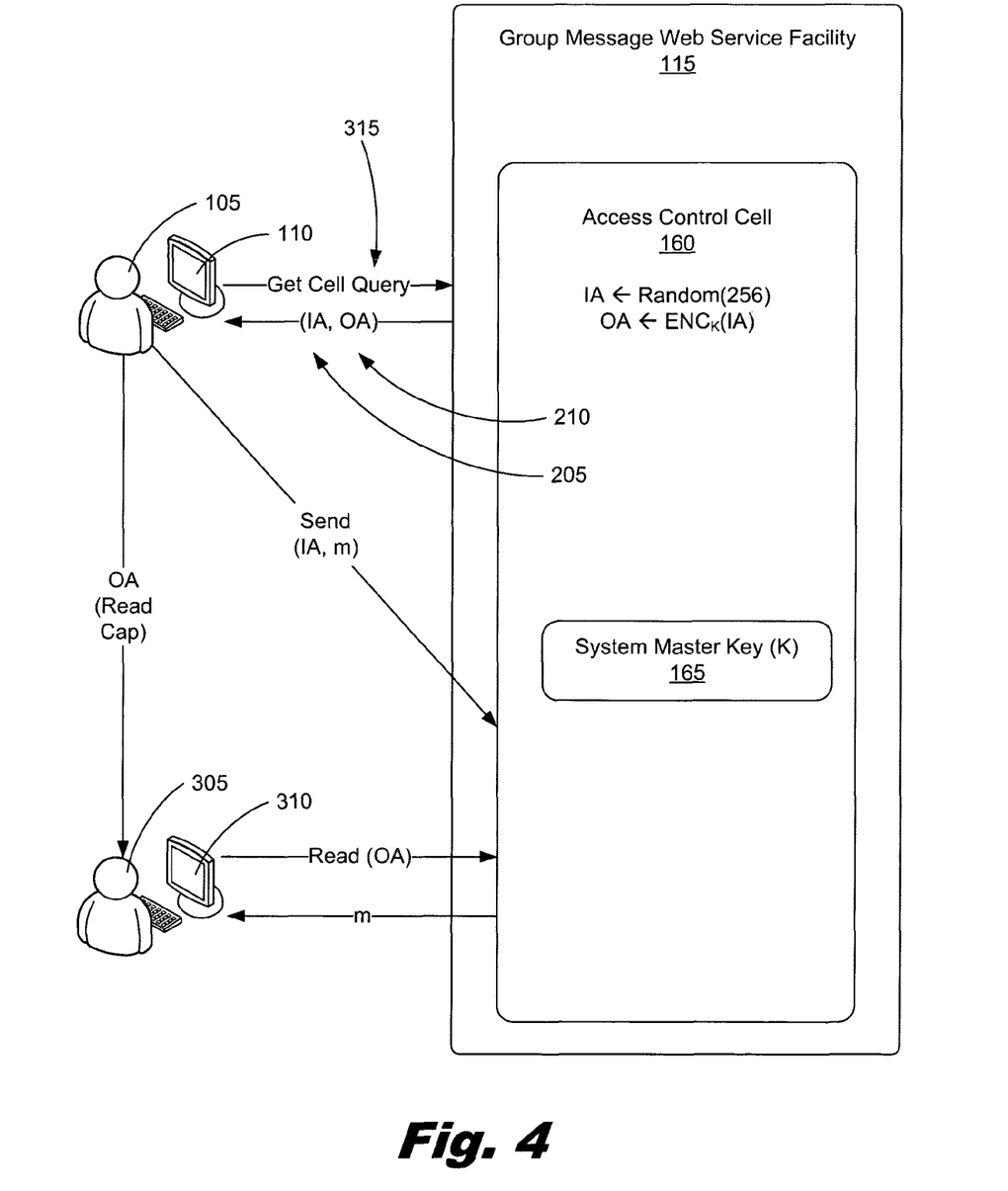
FIG. 4 is a diagram of an access control cell is shown being implemented to provide a user, via a computing device, with the ability to give another user the ability to receive or read messages from the user, according to one example of principles described herein is shown.

Turning now to FIG. 4, an access control cell (160) is shown being implemented to provide a user (105), via a computing device (110), with the ability to give another user (305) the ability to receive or read messages from the user (105), according to one example of principles described herein. Again, to allow non-system users (305) to receive messages from the users (105) of the group message web service (GMWS) facility (115), the user (105) may perform the computational protocols shown in FIG. 4. Specifically the user (105) may send a get cell query message (315) to the group message web service (GMWS) facility (115). The get cell query message (315) may be sent, for example, in the form of an HTTP message or confidential and secure messaging system that can assure that the message remains confidential.

When sending a get cell query message (315) to the group message web service (GMWS) facility (115), the user (105) may obtain an input address (205) and an output address (210), again denoted in FIG. 4 as IA and OA, respectively. Specifically, when the user (105) sends a get cell query message (315) to the group message web service (GMWS) facility (115), the group message web service (GMWS) facility (115) generates a random access control cell (160) that contains a randomized input address (205) and output address (210). The access control cells (160) generate the input address (205) and output address (210) using a number of equations. In a similar fashion as that described in FIG. 3, the input address (205) may be generated using a symmetric encryption method such as, for example, the US National Institute of Standards and Technology's Advanced Encryption Standard with a key size of 256 bits ($AES_{256}^{13}$). Additionally, the access control cell (160) may generate the output address (210) by encrypting the randomly generated input address (205) using the system master key (165) again denoted as "K" in FIG. 4.

Once the user (105) has obtain the randomized input address (205) and output address (210), and in order to allow non-system user (305) to be able to receive messages from the user (105), the user (105) may send the output address (205) to the non-system user (305). With the knowledge of the output address (210), the non-system user (305), through an appropriate computing device (310), may receive a message containing the input address (205) to the access control cell (160). The access control cell (160) may then know, through the attached input address (205), that the receiver of the message, denoted by m in FIG. 4, is authorized to have the message forwarded to them by the user (105). By this method, the group message web service (GMWS) facility (115) ensures that messages sent to random access control cells (160) are not forwarded onto the wrong recipient.

As the non-system user (305) receives the message from the access control cell (160) along with the input address (205), the access control cell (160) mechanically computes the output address (210) by decrypting the attached input address (205) using the system master key (165), i.e. OA=$D_K$(IA). Therefore, the system master key (165) is kept secret by the access control cell (160) and at no time do any non-system users (305) know the system master key (165).

After the access control cell (160) has converted the input address (205) to the output address (210) using the system master key (165), the access control cell (160) may then allow the message to be forwarded onto the non-system user (305). Therefore, the non-system user (305) listening for a message containing the specific output address (210) will receive and be able to read the message sent by the user (105). Indeed, in this way, the user (105), by sharing the output address (210) with only those users to whom he or she wishes to send messages, may send those messages in a secure manner. The user (105) may, therefore, share the output address (205) with multiple users or non-users of the system (FIG. 1, 100) that he or she wishes to receive a message, thereby creating a logical group of receivers.

The user (105) may additionally be given the ability to revoke the capability of a non-system user (305) to receive messages from the user (105) without effecting the capability of other users to receive the user's (105) messages. Specifically, the user (105) may direct the system (FIG. 1, 100) to stop forwarding messages having a specific output address (210) corresponding to a specific shared input address (205). Therefore, a number of access control cells (160) may be created by the user sending a get cell query message (315), each cell (160) containing a different input address (205) and corresponding output address (210).

Figure 5:
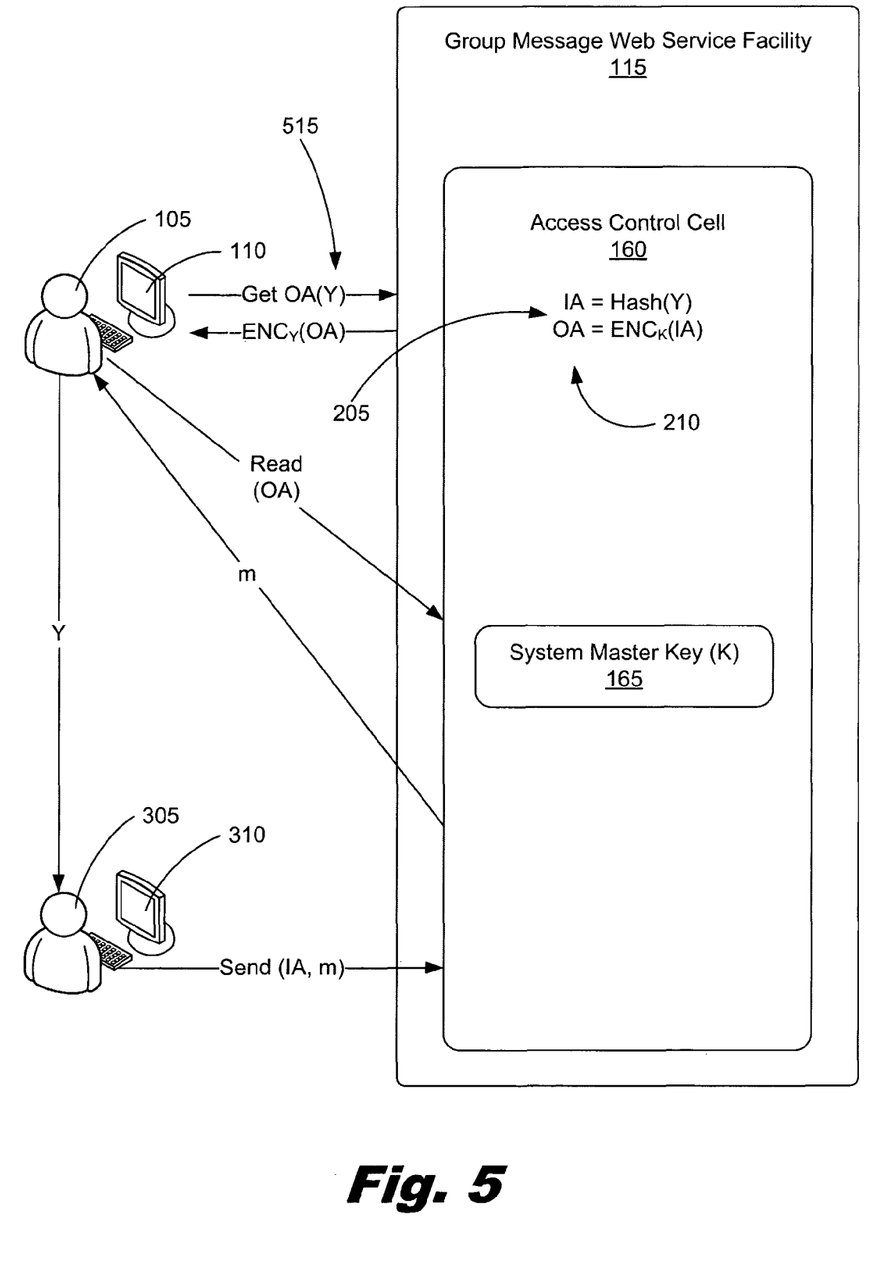
FIG. 5 is a diagram of an access control cell being implemented to provide a user, via a computing device, with the ability to give another user the ability to send or write messages to the user, according to another example of principles described herein.

FIG. 5 is an access control cell (160) shown as being implemented to provide a user (105), via a computing device (110), with the ability to give another user (305) the ability to send or write messages to the user (105), according to another example of principles described herein. Similar to the group message web service (GMWS) facility (115) described in FIG. 3, a user (105) may have the ability to choose who can and cannot send messages, denoted by "m" in the drawings, to him or her. However, unlike FIG. 3, FIG. 5 depicts an identification-based access control cell (160). Because some users may not have any other interaction previously with the user (105) and therefore would not have the information used to send or receive messages, namely the input address (FIGS. 3 and 4, 205) or the output address (FIGS. 3 and 4, 210), this system may be implemented in order to allow other users to send or receive messages.

In the scenario presented in FIG. 5, the user (105) may send his or her public key, denoted by "y" in the drawings, to the group message web service (GMWS) facility (115) to get either an input address (205) or an output address (210) corresponding to the user's (105) public key. Specifically, the user (105) may send a get address query message (415) to the group message web service (GMWS) facility (115). In the scenario depicted in FIG. 5, the get address query message (515) is a query to receive an output address (210) based on the user's (105) public key y. In one example, the public key may be some random value provided to the user (105) of the system (FIG. 1, 100). In another example, the public key may be chosen by the user (105) and may remain confidential between the group message web service (GMWS) facility (115) and the user (105), as well as between the user (105) and those other users who he or she wishes to interact with. Additionally, the get address query message (515) may be sent, for example, in the form of an HTTP message or confidential and secure messaging system which can assure that the message remains confidential.

Once the get address query message (515) has been sent, an access control cell (160) may be generated and the respective address will be computed and sent back to the user (105). In the scenario depicted in FIG. 5, the user (105) has requested to receive an output address (210). The access control cell (160) may, therefore, first calculate the input address (205) by applying the public key to a hash function. The hash function can be any hash function and may be, for example, SHA3 which has a 256-bit output. Additional hash functions may be used, for example, hash functions that also output values having an address size of 256-bits.

The user (105), therefore, sends the public key y to users (305) with which he or she wishes to interact. The individual users (305) can then compute either the input address (205) or the output address (210) as the output of the hash function and compute either the input address (205) or the output address (210) using the user's (105) provided public key as the input of the hash function. This way, users (305) without prior interaction with the user (105) can either send or receive messages to or from the user (105).

In this scenario, if the user wishes to change the previous ability of other users to send or receive messages, the user may simply adopt a new public key. In another example, the public key may be augmented with a counter such that the user (105) can revoke the capability from an access control cell (160) without having to change the public key.

Figure 6:
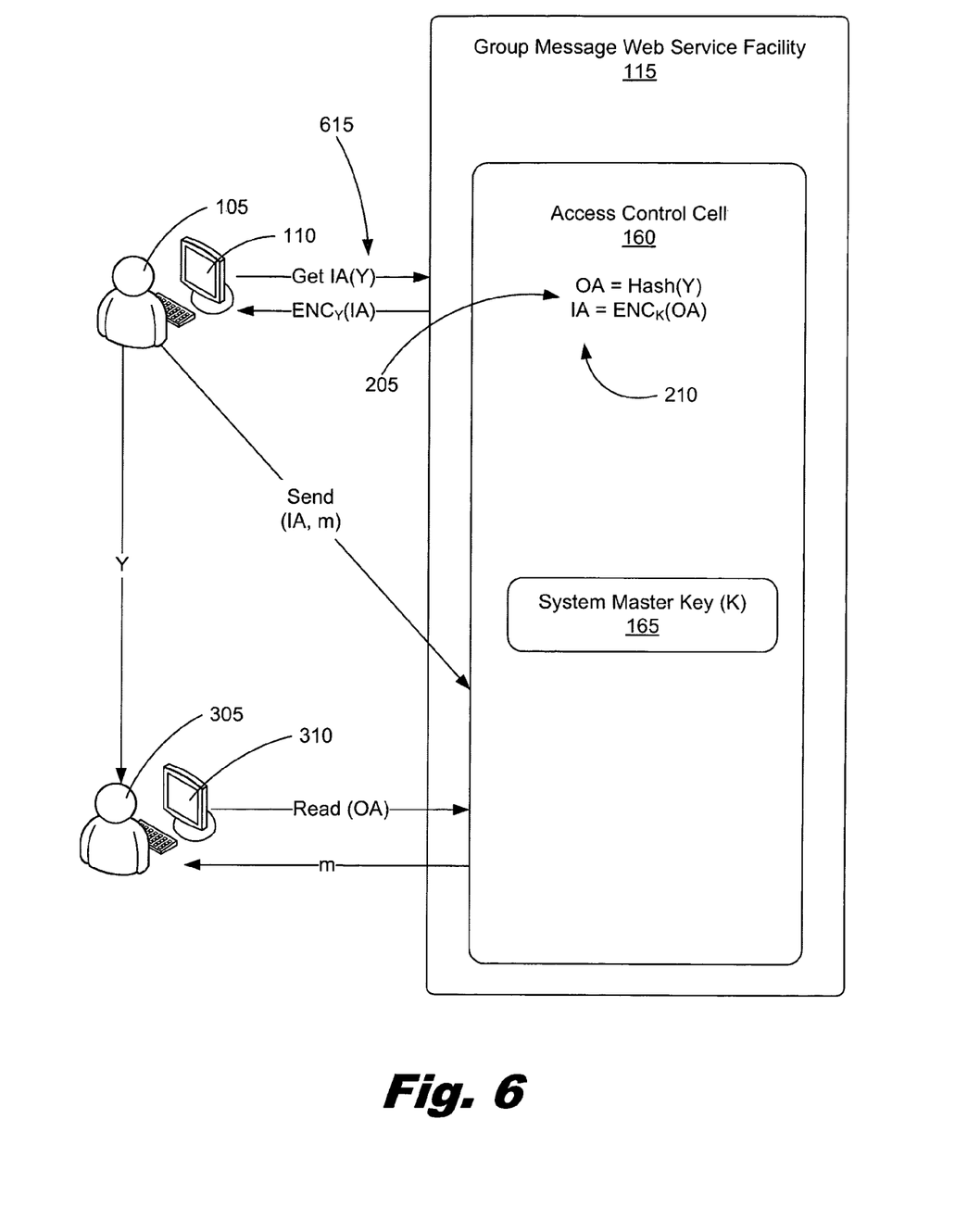
FIG. 6 is a diagram of an access control cell being implemented to provide a user, via a computing device, with the ability to give another user the ability to receive or read messages from the user, according to another example of principles described herein.

Turning now to FIG. 6, an access control cell (160) is shown being implemented to provide a user (105), via a computing device (110), with the ability to give another user (305) the ability to receive or read messages from the user (105. In the example depicted in FIG. 6, the get address query message (615) is a query to receive an input address (210) based on the user's (105) public key y. Again, in one example, the public key may be some random value provided to the user (105) by the system (FIG. 1, 100). In another example, the public key may be chosen by the user (105) and may remain confidential between the group message web service (GMWS) facility (115) and the user (105), as well as between the user (105) and those other users who he or she wishes to interact with. Additionally, the get address query message (615) may be sent, for example, in the form of an HTTP message or confidential and secure messaging system which can assure that the message remains confidential.

Once the get address query message (615) has been sent, an access control cell (160) may be generated and the respective address will be computed and sent back to the user (105). In the scenario depicted in FIG. 6, the user (105) has requested to receive an input address (205). The access control cell (160) may, therefore, first calculate the input address (205) by applying the public key to a hash function. The hash function can be any hash function, and may be, for example, SHA3 which has a 256-bit output. Additional hash functions may be used, for example, hash functions that output values having an address size of 256-bits.

The user (105), therefore, sends the public key y to users (305) with which he or she wishes to interact. The individual users (305) can then compute either the input address (205) or the output address (210) as the output of the hash function and compute either the input address (205) or the output address (210) using the user's (105) provided public key as the input of the hash function. This way, users (305) without prior interaction with the user (105) can either send or receive messages to Or from the user (105).

Again, in order to revoke the corresponding access control cells (160), the user (105) will have to stop sending or receiving messages to or from the access control cell (160) and use another public key value if he or she wishes to freshly avail the services of the access control cell (160). In one example, the public key may be augmented with a counter such that the user (105) can revoke the capability from an access control cell (160) without having to change the public key.

Figure 7:
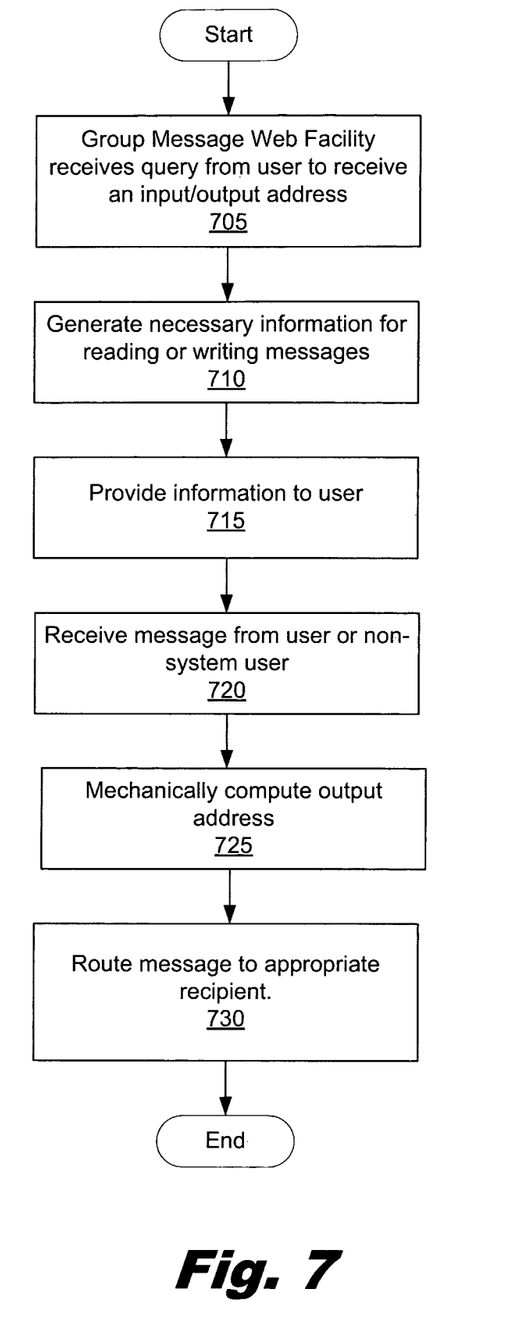
FIG. 7 is a flowchart showing a method for operating a distributed messaging system, according to one example of the principles described herein.

FIG. 7 is a flowchart showing a method for operating a distributed messaging system, according to one example of the principles described herein. The process begins with the group message web service (GMWS) facility (115) receiving (Block 705) from the user (FIG. 1, 105) a get cell query (FIGS. 3 and 4, 315) or a get Output address/Input address query (FIG. 5, 515 and FIG. 6, 615). Again, as previously mentioned above, the get cell query (FIGS. 3 and 4, 315) or a get Output address/Input address query (FIG. 5, 515 and FIG. 6, 615) may be sent over a secure channel such as, for example, secure Hypertext Transfer Protocol (HTTP).

Once the group message web service (GMWS) facility (FIGS. 1, 3, 4, 5, and 6, 115) has received (Block 705) the get cell query (FIGS. 3 and 4, 315) or a get Output address/Input address query (FIG. 5, 515 and FIG. 6, 615) it generates (Block 710) the information which the user (FIG. 1, 105) may pass onto other users (FIGS. 3, 4, 5, and 6; 305) for them to be able to send and receive messages from the user (FIG. 1, 105). As described above, the information may be comprised of a number of generated access control cells (FIGS. 1, 2, 3, 4, 5, and 6, 160) or secure and randomized input address (FIGS. 3 and 4, 205) or output address (FIGS. 3 and 4, 210). This information is then provided (Block 715) to the user (FIG. 1, 105) by the group message web service (GMWS) facility (FIGS. 1, 3, 4, 5, and 6, 115).

The user (FIG. 1, 105) is then free to send either the generated input address (FIGS. 2, 3, and 4, 205), output address (FIGS. 2, 3, and 4, 205), or public key depending on the situation to the non-system user (FIGS. 3, 4, 5, and 6, 305) as described above. Once the non-system user (FIGS. 3, 4, 5, and 6, 305) has received this information, he or she will be able to send or receive (Block 720) a message to or from the user (FIGS. 1, 3, 4, 5, 6, 105). When, for example, the generated access control cell (FIGS. 1, 2, 3, 4, 5, and 6, 160) receives a message (Block 720) from a non-system user (FIGS. 3, 4, 5, and 6, 305), the message may contain an input address (FIGS. 2, 3, and 4, 205). When the access control cell (FIGS. 1, 2, 3, 4, 5, and 6, 160) receives this information, it mechanically computes (Block 725) the output address (FIGS. 2, 3, and 4, 205).

After the access control cell (FIGS. 1, 2, 3, 4, 5, and 6, 160) mechanically computes (Block 725) the output address (FIGS. 2, 3, and 4, 205) the access control cell (FIGS. 1, 2, 3, 4, 5, and 6, 160) routes (Block 730) the message onto the appropriate recipient.

The methods described above can be accomplished by a computer program product comprising a computer readable storage medium having computer usable program code embodied therewith that, when executed, performs the above methods. Specifically, the computer usable program code, when executed by the processor (FIG. 1, 125), causes the processor (FIG. 1, 125) to send a get cell query (FIGS. 3 and 4, 315) or a get Output address/Input address query (FIG. 5, 515 and FIG. 6, 615) to a group message web service (GMWS) facility (FIGS. 1, 3, 4, 5, and 6, 115). The computer usable program code, when executed by a processor, may also cause a group message web service (GMWS) facility (FIGS. 1, 3, 4, 5, and 6, 115) mechanically compute an output address (FIGS. 2, 3, and 4, 205) and input address (FIGS. 2, 3, and 4, 205) and send the output address (FIGS. 2, 3, and 4, 205) and input address (FIGS. 2, 3, and 4, 205) to a user of the system (FIG. 1, 100). Still further the computer usable program code, when executed by the processor, may cause an access control cell (FIGS. 1, 2, 3, 4, 5, and 6, 160) to mechanically convert either an output address (FIGS. 2, 3, and 4, 205) or input address (FIGS. 2, 3, and 4, 205) associated with a sent message to a reciprocal input address (FIGS. 2, 3, and 4, 205) or output address (FIGS. 2, 3, and 4, 205).

The specification and figures describe a communication access control system. The system assures that messages sent to random access control cells will be dropped without ever being read. The system further provides a user with a highly centralized access policy decisions and centralized access policy enforcement. Therefore, a user may use the group message web service facility from a myriad of types of computing devices including cell phones, laptop computers, and desktop computers. Additionally, because the system is a secure and server-aided multipoint-to-point and point-to-multipoint communication paths available, it is possible for a group of users to interact with each other in a real-time and secure manner.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A communication access control system, comprising:
   a computing entity comprising a processor and memory;
   at least one access control cell, implemented on the computing entity, for computing random input addresses and random output addresses upon a request of a system user;
   wherein said input and output addresses are based on a cryptographic key held by a service facility associated with said at least one access control cell,
   wherein the at least one access control cell generates each random output address using a cryptographically secure pseudo-random number generator, and computes each random input address as a symmetrical encryption function of a corresponding random output address and an encryption key,
   and wherein the access control cell receives a message from a first user containing an input address and routes that message to a second users after converting the input address into the corresponding output address using the cryptography key.

2. The system of claim 1, wherein said service facility dynamically creates access control cells upon request of a system user.

3. The system of claim 1, in which the message is a communication from one human user to another.

4. The system of claim 1, in which the message is an operational command to a computing entity in a distributed computing environment.

5. The system of claim 1, in which the at least one access control cell is stored on a user's computing device to control access to that user's computing device.

6. The system of claim 1, further comprising a number of access control cells each residing on a different computing entity within a distributed computing environment.

7. A method for operating a distributed messaging system comprising, with a programmed processor:
   receiving at a group message web service (GMWS) facility a query from a user to receive an input address and output address;
   generating a random input address and random output address, the random output address generated using a cryptographically secure pseudo-random number generator, and the random input address generated as a symmetrical encryption function of the random output address and a cryptographic key;
   providing the user with the input address and output address;
   receiving a message containing an input address;
   computing the output address using the cryptography key;
   routing the message based on the output address computed; and
   dynamically creating an access control cell associated with the GMWS facility, the access control cell computing the random input address and the random output address upon request of system users.

8. The method of claim 7, in which the access control cells are stored on the user's computing devices.

9. The method of claim 7, in which the cryptography key is not accessible by users of the system.

10. The method of claim 7, in which the system is implemented on a distributed computing environment.

11. The method of claim 7, in which the random input address and random output addresses are 256-bit cryptographic numbers.

12. A computer program product comprising a non-transitory computer readable storage medium having computer usable program code embodied therewith, the computer usable program code, when executed by a processor of a group message web facility, causes that processor to:
   receive a message containing an input address having a corresponding output address, the output address previously generated using a cryptographically secure pseudo-random number generator, and the input address previously generated as a symmetrical encryption function of the output address and a cryptographic key;
   compute the output address using the cryptography key;
   route the message based on the output address computed; and
   dynamically create an access control cell associated with a group message web service (GMWS) facility, the access control cell computing the random input address and the random output address upon request of system users,
   wherein the symmetrical encryption function means that the input address can be generated from the output address and the output address can be generated from the input address.

13. The computer program product of claim 12, further comprising
   computer usable program code, when executed by a processor of a group message web facility, causes that processor to store the input address and output address on a users' computing device.

* * * * *